(12) United States Patent
Haynes et al.

(10) Patent No.: US 11,066,176 B2
(45) Date of Patent: Jul. 20, 2021

(54) CANOPY SUPPORT LANE DIVIDER (71) Applicant: GOODRICH CORPORATION, Charlotte, NC (US)

(72) Inventors: Timothy C Haynes, Prescott Valley, AZ (US); Guillermo Gonzalez, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 674 days.

(21) Appl. No.: 15/952,122

(22) Filed: Apr. 12, 2018

(65) Prior Publication Data
US 2019/0315475 A1 Oct. 17, 2019

(51) Int. Cl.
*B64D 25/14* (2006.01)
(52) U.S. Cl.
CPC .................... *B64D 25/14* (2013.01)
(58) Field of Classification Search
CPC ........ B64D 25/14; Y10S 244/905; A62B 1/20
See application file for complete search history.

(56) References Cited

U.S. PATENT DOCUMENTS

| | | | | |
|---|---|---|---|---|
| 3,470,991 A * | 10/1969 | Holcombe | ................ | A62B 1/20 193/25 B |
| 3,712,417 A * | 1/1973 | Chacko | .................. | B64D 25/14 182/48 |
| 3,845,920 A * | 11/1974 | Satterfield | .............. | B64D 25/14 244/137.2 |
| 4,332,049 A | 6/1982 | Fisher | | |
| 4,684,079 A * | 8/1987 | Miller | ..................... | B64D 25/14 193/25 B |
| 5,360,186 A * | 11/1994 | Danielson | .............. | B64D 25/14 193/25 B |
| 9,701,411 B2 * | 7/2017 | Kohlmeier-Beckmann | ................. | B64D 25/14 |
| 10,000,292 B1 * | 6/2018 | Haynes | ................... | A62B 1/20 |

* cited by examiner

*Primary Examiner* — Valentina Xavier
(74) *Attorney, Agent, or Firm* — Snell & Wilmer L.L.P.

(57) ABSTRACT

An evacuation system may comprise a packboard, an evacuation slide configured to deploy from the packboard, and a lane divider attached to the evacuation slide, wherein a first end and a second end of the lane divider are detachably coupled to a center tube of the evacuation slide, wherein a connecting member is coupled to the center tube between the first end and the second end of the lane divider. The lane divider may be in fluid communication with the center tube. A detachable restraint may be disposed between first end and the center tube, the detachable restraint comprising a first portion coupled to the center tube and a second portion coupled to first end, wherein the first portion of the detachable restraint detachably couples to the second portion of the detachable restraint.

20 Claims, 5 Drawing Sheets

CANOPY SUPPORT LANE DIVIDER

FIELD

The present disclosure relates to aircraft evacuation systems and, in particular, to an evacuation slide having a multipurpose lane divider.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. A canopy for providing shelter, after a water landing, may be included with the evacuation system, as set forth by various governmental agencies. Current canopy designs tend to employ a waterproof canopy, which can be tied or otherwise secured to the slide/raft, and canopy support tubes configured to provide distance between the canopy and the sliding surface. The canopy supports tubes may be integral to the side rails of the slide/raft such that the support tubes inflate upon inflation of the slide or the canopy supports tubes may be distinct components that are manually attached to the slide and orally inflated by an evacuee. The support tubes tend to add extra weight to the evacuation system while serving a single purpose (i.e., canopy support). Further, inflating and/or attaching the support tubes can be difficult in high wind conditions.

SUMMARY

An evacuation system may comprise a packboard, an evacuation slide configured to deploy from the packboard, and a lane divider attached to the evacuation slide, wherein a first end and a second end of the lane divider are detachably coupled to a center tube of the evacuation slide, wherein a connecting member is coupled to the center tube between the first end and the second end of the lane divider.

In various embodiments, the lane divider is in fluid communication with the center tube. In various embodiments, a detachable restraint is disposed between first end and the center tube, the detachable restraint comprising a first portion coupled to the center tube and a second portion coupled to first end, wherein the first portion of the detachable restraint detachably couples to the second portion of the detachable restraint. In various embodiments, the detachable restraint comprises at least one of a hook-and-loop type fastener, a snap-fastener, or speed lacing. In various embodiments, a lanyard may be coupled to the first end and the second end of the lane divider, wherein the lanyard maintains the first end and the second end at a desired angle relative to the sliding surface. In various embodiments, a canopy may be disposed over the evacuation slide, wherein the first end and the second end support the canopy and maintain a distance between the canopy and the sliding surface. In various embodiments, the system further comprises a first canopy support connecter attached to the canopy and a second canopy support connecter attached to the canopy, first portion of a first detachable coupling attached proximate a first tip of the first end, and a second portion of a second detachable coupling attached proximate a second tip of the second end, wherein the first portion is coupled to the first canopy support connector and the second portion is coupled to the second canopy support connector.

In various embodiments, the first end and the second end of the lane divider comprise a conical shape. In various embodiments, the first end and the second end are configured to rotate away from the sliding surface.

A slide for an evacuation system may comprise a sliding surface, a center tube, and a lane divider attached to the center tube, wherein a first end and a second end of the lane divider are detachably coupled to the center tube of the evacuation slide, wherein a connecting member is coupled to the center tube between the first end and the second end of the lane divider, wherein in the sliding surface extends between a first side rail and a second side rail and is divided by the lane divider.

In various embodiments, the lane divider is in fluid communication with the center tube. In various embodiments, a first detachable restraint is disposed between the first end and the center tube and a second detachable restraint disposed between the second end and the center tube. In various embodiments, the first detachable restraint comprises a first portion and a second portion, wherein the second detachable restraint comprises a third portion and a fourth portion, wherein the first portion and the fourth portion are coupled to the center tube, wherein the second portion is coupled to the first end, and wherein the third portion is coupled to the second end. In various embodiments, the slide further comprises a lanyard coupled between the first end and the second end, wherein the lanyard maintains the first end and the second end at a desired angle to the sliding surface. In various embodiments, the first end and the second end of the lane divider rotate away from the sliding surface. In various embodiments, the first end and the second end of the lane divider comprise a conical shape. In various embodiments, the slide further comprises a canopy having a surface facing the sliding surface, wherein the canopy comprises a first canopy connecter coupled to the surface and a second canopy connector coupled to the surface, wherein the second portion is removably coupled to the first canopy connector and the third portion is removably coupled to the second canopy connector.

A method of making an evacuation system may comprise attaching a lane divider comprising a first end, a second end, and a connecting member to an evacuation slide at the connecting member, and configuring the first end and the second end of the lane divider to rotate away from a sliding surface of the evacuation slide, wherein the configuring comprises defining a first joint between the connecting member and the first end and a second joint between the connecting member and the second end.

In various embodiments, the method may further comprise disposing a first detachable restraint between the first end and a center tube and a second detachable restraint between the second end and the center tube. In various embodiments, the lane divider is in fluid communication with the evacuation slide, wherein the coupling the connecting member defines a first joint and a second joint.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Evacuation systems of the present disclosure may include inflatable slides having a canopy support lane divider. The lane divider may include a portion that is detachably coupled to the inflatable slide, such that a first end of the lane divider may be rotated away from a sliding surface of the inflatable slide. Thus, the lane divider, when attached, may serve to divide the sliding surface into multiple sliding lanes, allowing for faster evacuation of passengers, and in the event of a water landing, the lane divider may be erected (i.e., pivoted away from a sliding surface) to serve as a canopy support.

Figure 1:
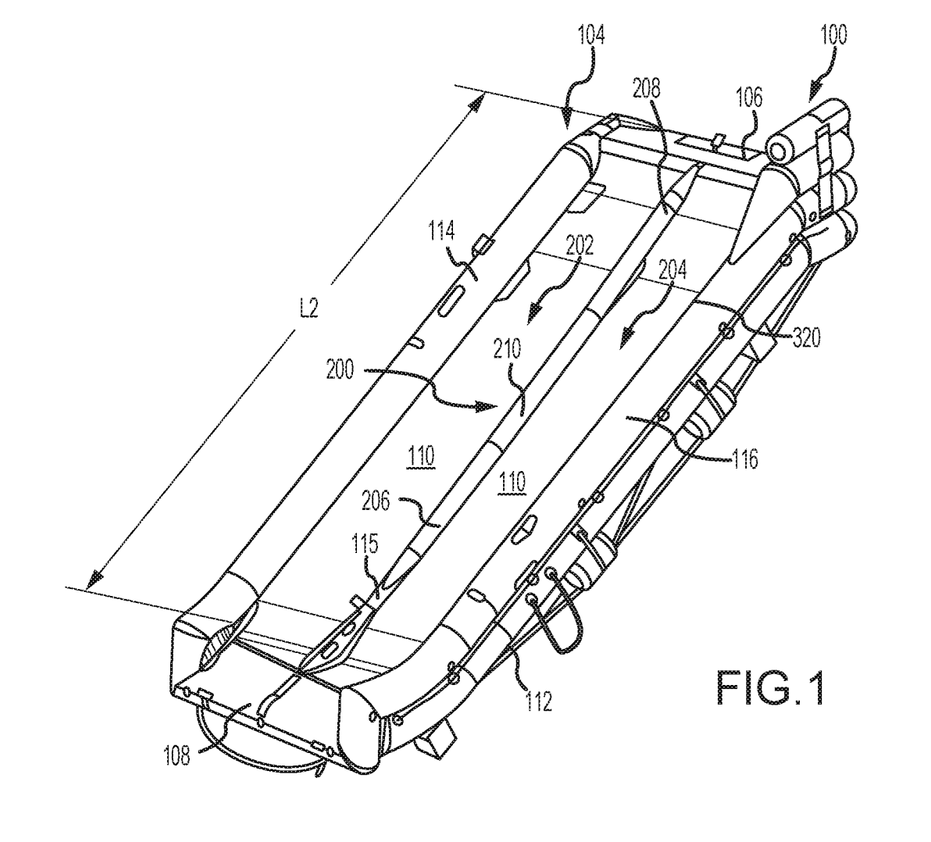
FIG. 1 illustrates a perspective view of an evacuation slide in a deployed position with a canopy support lane divider in a slide mode position, in accordance with various embodiments.

With reference to FIG. 1, an evacuation system 100 is illustrated, in accordance with various embodiments. Evacuation system 100 may comprise an evacuation slide 104. FIG. 1 illustrates evacuation slide 104 in an inflated and/or deployed position. Evacuation slide 104 may be deployed from an aircraft. Evacuation slide 104 may comprise an inflatable slide. Evacuation slide 104 may comprise a head end 106 and a toe end 108 opposite head end 106. Head end 106 may be coupled to an aircraft structure. Upon deployment, toe end 108 may contact an exit surface (e.g., the ground or the water) in response to evacuation slide 104 being deployed. In the event of a water landing, evacuation slide 104 may be uncoupled from the aircraft structure and serve as a life raft.

Figure 2:
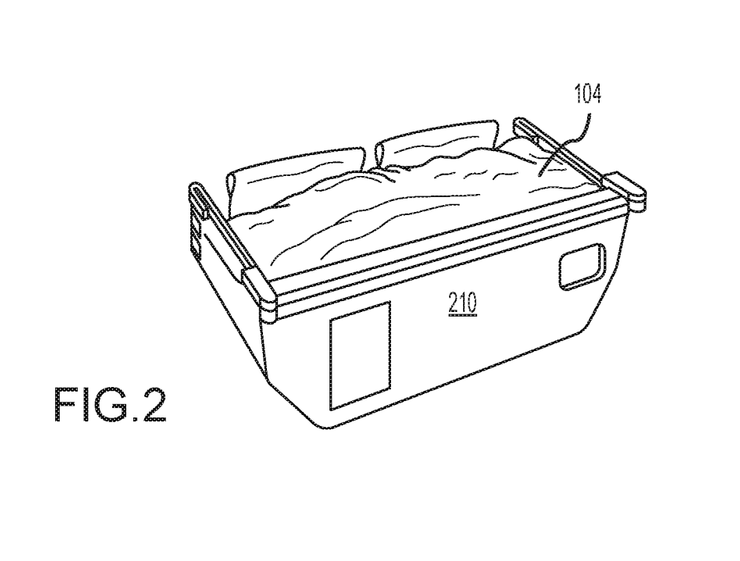
FIG. 2 illustrates a perspective view of an evacuation slide in a stowed position, in accordance with various embodiments.

Referring to FIG. 2, evacuation slide 104 is illustrated in a stowed and/or packed position. In this regard, evacuation slide 104 may be stowed in a packboard 120. In various embodiments, evacuation slide 104 may be folded in the stowed position. In various embodiments, evacuation slide 104 may be deployed from packboard 120 in response to opening an emergency exit door. Packboard 120 may be coupled to an aircraft in an installed position. Typically, a packboard 120 includes a blow-out panel which opens in response to deployment of evacuation slide 104 and through which the inflatable slide may exit the packboard 120. In this regard, evacuation slide 104 may be configured to be deployed from an aircraft.

Returning to FIG. 1, evacuation slide 104 may comprise a sliding surface 110 and an underside surface 112 opposite sliding surface 110. Sliding surface 110 may extend from head end 106 to toe end 108. Evacuation slide 104 may comprise a first side rail 114, a second side rail 116, and a center tube 115 parallel and disposed between first side rail 114 and second side rail 116. First side rail 114 and second side rail 116 may be disposed on opposing sides of evacuation slide 104, and may extend from head end 106 to toe end 108. First side rail 114, second side rail 116, and center tube 115 may be integrally formed and in fluid communication. Stated differently, first side rail 114 and second side rail 116 may be part of a one interconnected chamber that fills with gas upon deployment of evacuation slide 104.

Evacuation system 100 comprises a canopy support lane divider 200. Lane divider 200 may be attached to evacuation slide 104. Lane divider 200 may divide evacuation slide 104 into two lanes. For example, lane divider 200 may divide sliding surface 110 into a first slide lane 202 and a second slide lane 204. Lane divider 200 may be located relatively above center tube 115 and approximately half way between first side rail 114 and second side rail 116. In various embodiments, sliding surface 110 may extend between first side rail 114 and second side rail 116.

Lane divider 200 may comprise a first end 206 oriented toward toe end 108, a second end 208 located proximate head end 106, and a connecting member 210 connecting first end 206 and second end 208. In various embodiments, with momentary combined reference to FIG. 1 and FIG. 4, lane divider 200 may comprise a length L1 extending from first tip 218 of first end 206 to second tip 216 of second end 208. Slide 104 may comprise a length L2 extending from head end 106 to toe end 108. In various embodiments, length L1 may be between 20% and 90% of length L2. In various embodiments, length L1 may be between 50% and 80% of length L2 of slide 104.

Figure 3:
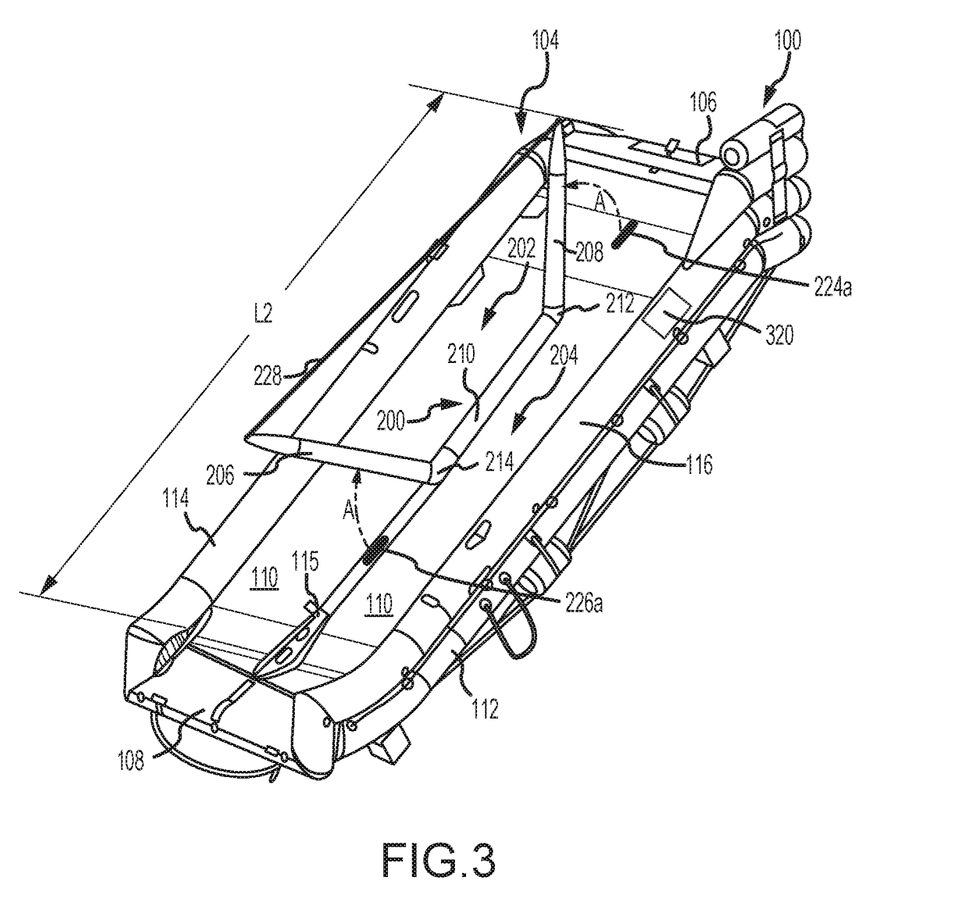
FIG. 3 illustrates a perspective view of an evacuation slide in a deployed position with a canopy support lane divider in a canopy mode position, in accordance with various embodiments.
Figure 4:
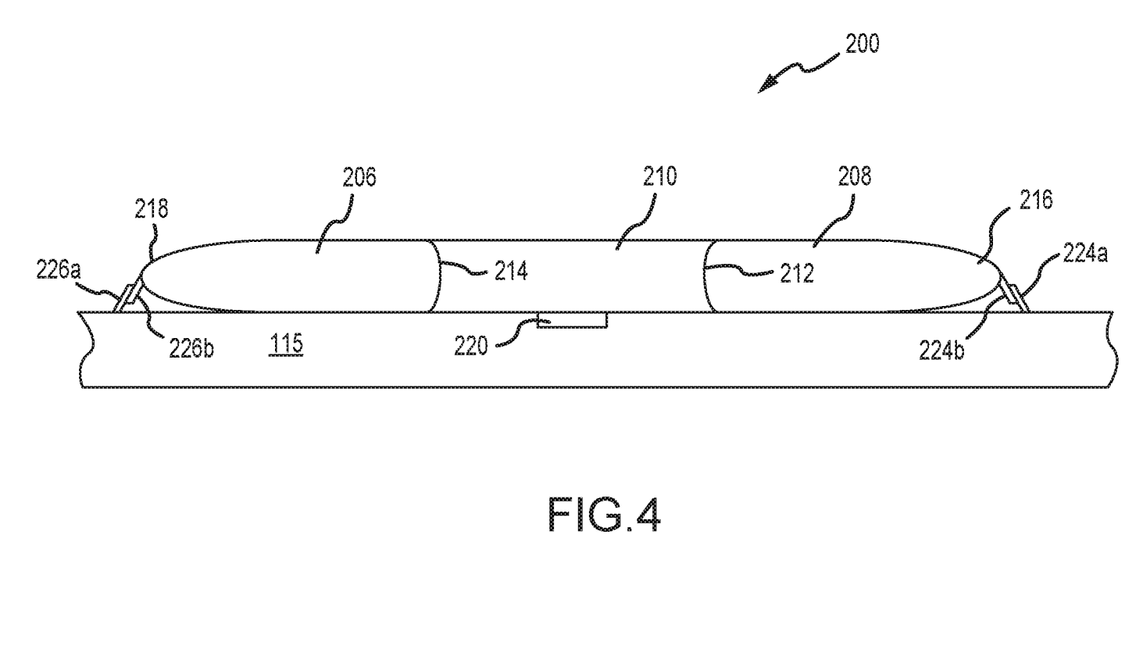
FIG. 4 illustrates a canopy support lane divider for an evacuation slide, in accordance with various embodiments.

Referring to FIG. 4, lane divider 200 may be releasably coupled to slide 104. In various embodiments, a portion of connecting member 210 may be bonded to center tube 115 and the bonded portion may define a first joint 214 and a second joint 212. In various embodiments, first end 206 and second end 208 may be detachably coupled to center tube 115. A first detachable restraint 226 may detachably couple first end 206 of lane divider 200 to center tube 115 and a second detachable restraint 224 may detachably couple second end 208 of lane divider 200 to center tube 115. For example, in various embodiments, a first portion 226a of first detachable restraint 226 may be attached to center tube 115, and a second portion 226b of first detachable restraint 226 may be attached proximate to first tip 218 of first end 206. Second portion 226b may be configured to engage first portion 226a. When first portion 226a is engaged by second portion 226b, first end 206 of lane divider 200 remains proximate to center tube 115 and sliding surface 110. When first portion 226a is disengaged from second portion 226b, first end 206 of lane divider 200 may be rotated away from center tube 115 and sliding surface 110, tending to pivot at first joint 214 as shown in FIG. 3 by the path of arrows A. In a like manner, a third portion 224b of second detachable restraint 224 may be attached proximate second tip 216 of second end 208 and a fourth portion 224a of second detachable restraint 224 may be attached to center tube 115. When fourth portion 224a is engaged by third portion 224b, second end 208 of lane divider 200 remains proximate to center tube 115 and sliding surface 110. In response to fourth portion 224a being disengaged from third portion 224b, second end 208 of lane divider 200 may be rotated away from center tube 115 and sliding surface 110, tending to pivot at second joint 212

In various embodiments, a detachable restraint such as first detachable restraint 226 may include, hook-and-loop fasteners, snap-fasteners, speed lacing, or other detachable fastener. A hook-and-loop type fastener (also referred to as a hook-and-pile fastener, touch fastener, or Velcro®) is comprised of two sections, one section having an array of hook-like projections that engage an array of loop-like projections of a second section. A snap-fastener (also referred to as a press stud, a snap, or a itch button) is also comprised of two sections, one having a stud, projection, or lip that can be pressed into engagement with a complementary groove, receptacle, socket, or orifice to create a resistance and/or interference fit between the two sections. Speed lacing may comprise a lace threaded through a first set of openings defined by lane divider 200 and second set of opening defined by sliding surface 110. In various embodiments, a first portion, such as first portion 226a, of a detachable restraint, such as first detachable restraint 226, may include a first section of hook-and-loop material (e.g., one of either an array of hooks or an array of loops) or first snap-fastener elements (e.g., one of either a male stud or a female receptacle) or first openings, while a second portion, such as second portion 226b, of the detachable restraint may include a second section of hook-and-loop material (e.g., the other of the array of hooks or the array of loops) or second snap-fastener elements (e.g., the other of the male stud or the female receptacle), or a second set of openings. Accordingly, an evacuee may rotate first end 206 and second end 208 away from sliding surface 110 and center tube 115 by detaching the first portion 226a of first detachable restraint 226 from second portion 226b of first detachable restraint 226 and, in like manner, detaching the fourth portion 224a of the second detachable restraint 224 from the third portion 224b of the second detachable restraint 224 (e.g., by detaching a first section of hook-and-loop material from a second section of hook-and-loop material, by detaching a first snap-fastener elements from a second snap-fastener elements, or by removing a lace from a first and a second opening).

In various embodiments, a plurality of detachable restraints such as detachable restraint 226 may be located along a lane divider such as lane divider 200. The location, length, and/or number of detachable restraints disposed along a lane divider may be selected such that a detachable restraint will not unintentionally detach. For example, the location, length, and/or number of detachable restraints disposed along the lane divider may be selected such that the force exerted by evacuees jumping onto a sliding surface, such as sliding surface 110, will not lead to separation of a first portion, such as first portion 226a, from a second portion, such as second portion 226b. In various embodiments, first end 206 and second end 208 of lane divider 200 may each comprise a generally conical shape, a frustoconical shape, a hemispherical shape, an oblate shape, or a cylindrical shape, and connecting member 210 may comprise a generally cylindrical shape.

In various embodiments, as evacuation slide 104 inflates, lane divider 200 will inflate. Stated another way, lane divider 200 may be in fluid communication with slide 104 such that upon deployment of evacuation slide 104, gas may begin to flow into slide 104 and into lane divider 200. For example, gas may flow into lane divider 200 via a fill port 220 in connecting member 210 of lane divider 200. In various embodiments, fill port 220 may comprise a conduit or opening or a valve.

Upon inflation, lane divider 200 may serve as a divider to separate sliding surface 110 into first slide lane 202 and second slide lane 204 (FIG. 1). In the event of a water landing, first end 206 and second end 208 of lane divider 200 may be released (i.e., uncoupled) from center tube 115 and may serve as canopy support tubes. For example, lane divider 200 may be configured such that, when uncoupled from center tube 115, first end 206 and second end 208 may be rotated away from center tube 115 and sliding surface 110 as shown by arrows A of FIG. 3.

In various embodiments and with additional reference to FIG. 3, evacuation slide 104 is illustrated in a deployed position with lane divider 200 in a canopy support position, in accordance with various embodiments. Detachable restraints (i.e. first detachable restraint 226 and second detachable restraint 224) may be configured to separate in response to an evacuee pulling first end 206 and second end 208 of lane divider 200 away from center tube 115 and sliding surface 110. Upon release of first detachable restraint 226 and second detachable restraint 224 first end 206 and second end 208 of lane divider 200 may be rotated away from center tube 115 and sliding surface 110 (i.e., in the direction of arrows A) while first portion 226a and fourth portion 224a remain coupled to center tube 115. First end 206 and second end 208 may be rotated in the direction of arrows A until a desired angle to sliding surface 110 is achieved. Stated another way, first end 206 and second end 208 may be rotated in the direction of arrows A until an angle formed by first end 206 and sliding surface 110 and/or an angle formed by second end 208 and sliding surface 110 between 40 degrees and 100 degrees, or between about 60 degrees and 100 degrees, or between about 80 degrees and 100 degrees.

In various embodiments, when rotated to the desired angle return force tends to drive first end 206 and second end 208 to return toward the center tube 115. In various embodiments, the return force is a function of an internal pressure of canopy support lane divider 200 and an angle of the first end 206 or the second end 208 relative to the sliding surface 110. In various embodiments, a lanyard 228 may be coupled between first end 206 and second end 208 of lane divider 200. For example, lanyard 228 may be coupled to first tip 218 at first end 206 and to second tip 216 and second end 208. In various embodiments, lanyard 228 tends to resist the return force and may maintain first end 206 and second end 208 of lane divider 200 at the desired angle relative to sliding surface 110. In this regard, lanyard 228 is placed in tension and a tension of lanyard 228 may be a function of the return force. In various embodiments, lanyard 228 may comprise a rope, tape, ribbon, webbing, or any other suitable tie or strap. In various embodiments, lanyard 228 may be fixed between and coupled to second portion 226b of first detachable restraint 226 and third portion 224b of second detachable restraint 224.

Figure 5:
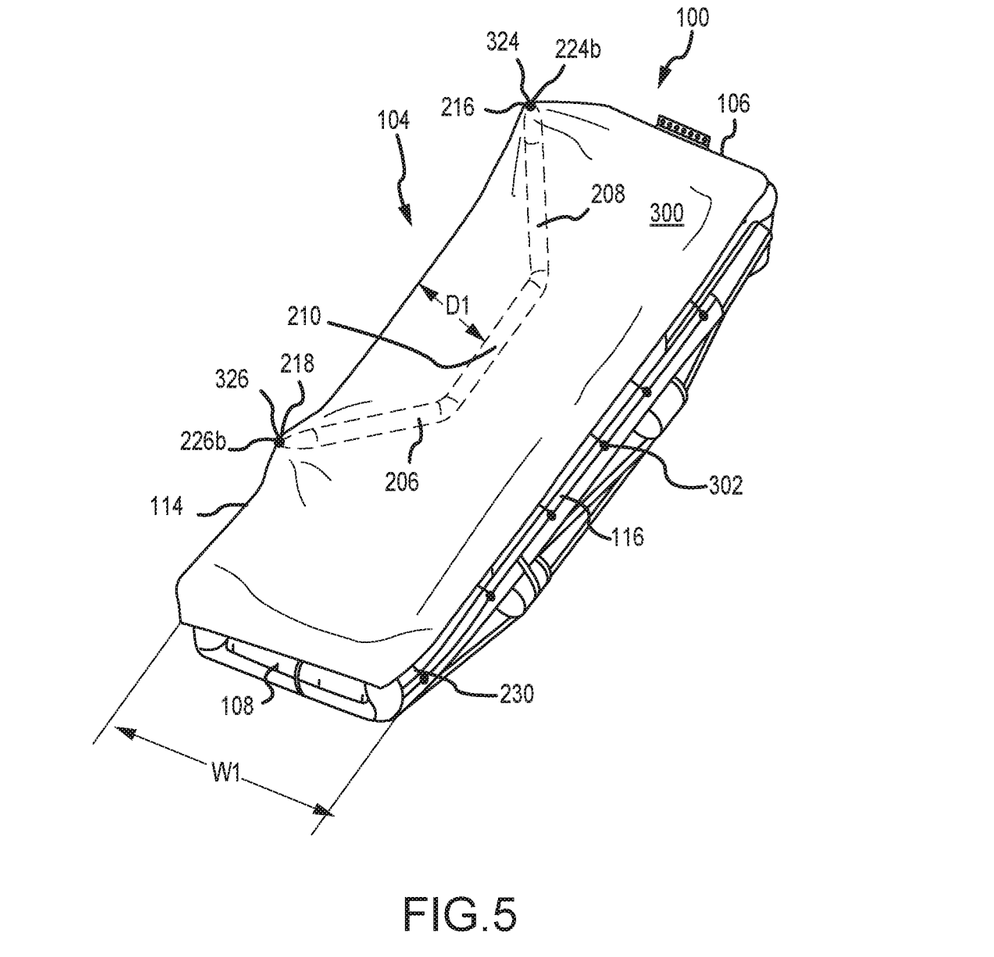
FIG. 5 illustrates a canopy attached to an evacuation slide having a canopy support lane divider, in accordance with various embodiments.

In various embodiments and with additional reference to FIG. 5, evacuation system 100 may include a canopy 300. Canopy 300 may be included in a canopy kit 320 (FIGS. 1 and 3) stored on and/or attached to slide 104. Canopy 300 may be disposed over slide 104 to provide shelter and protect evacuees from rain, sun, and/or wind. Canopy 300 may be tied to first side rail 114 and second side rail 116 via ties 302. First end 206 and second end 208 of lane divider 200 may support canopy 300 and maintain a distance D1 between canopy 300 and sliding surface 110. In various embodiments, and in a like manner to first end 206 and second end 208, lanyard 228 may tend to support canopy 300 and tend to maintain a distance D1 between canopy 300 and sliding surface 110. In various embodiments, first end 206 and second end 208 of lane divider 200 may be maintained at the desired angle relative to sliding surface 110 by coupling first portion 226a of first detachable coupling 226 to a first canopy connector 326 of canopy 300 and coupling third portion 224b of second detachable coupling 224 to a second canopy connector 324 of canopy 300, in this regard a first canopy tension force may develop between the first canopy connector 326 and the second canopy connector 324 which tends to resist the return force. In various embodiments, a second canopy tension force may develop between one of the first canopy connector 326 or the second canopy connector 324 and ties 302 at first side rail 114 and second side rail 116 which may tend to hold the first end 206 and/or the second end 208 at the desired angle (i.e., prevent first end 206 and second end 208 of lane divider 200 from rotating toward sliding surface 110 (FIG. 1)).

In various embodiments, a canopy connector, such as first canopy connector 326, may be included on a surface of canopy 300 which is oriented relatively toward lane divider 200. In various embodiments, a canopy connector may be configured to detachably couple to a portion, such as second portion 226b, of a detachable restraint, such as detachable restraint 226. For example, a portion, such as second portion 226b, may include a first section of hook-and-loop material (e.g., one of either an array of hooks or an array of loops) or first snap-fastener elements (e.g., one of either a male stud or a female receptacle) or a first tie, while a canopy connector may include a second section of hook-and-loop material (e.g., the other of the array of hooks or the array of loops) or second snap-fastener elements (e.g., the other of the male stud or the female receptacle), or a second tie. Accordingly, an evacuee may secure the first end 206 and/or the second end 208 of lane divider 200 to canopy 300 by coupling a portion, such as second portion 226b, of a detachable restraint, such as detachable restraint 226, to a canopy connector, such as first canopy connector 326 (e.g., by attaching the first section of hook-and-loop material to the second section of hook-and-loop material, by attaching the first snap-fastener element to the second snap-fastener element, or by tying the first tie to the second tie). While first canopy connector 326 and second canopy connector 324 may aid in the attachment of canopy 300 to lane divider 200, first canopy connector 326 and second canopy connector 324 may also allow an evacuee to orient canopy 300 in a proper direction. In other words, first canopy connector 326 and second canopy connector 324 may provide a visual cue allowing an evacuee to quickly find the center of canopy 300.

In various embodiments, lane divider 200 may tend to reduce the number of canopy support(s) required to support canopy 300. For example, a canopy support for head end 106 and a canopy support for toe end 108 may be eliminated from canopy kit 320. In various embodiments, lane divider 200 may also tend to eliminate or reduce the number of canopy supports along first side rail 114 and second side rail 116. Further, lane divider 200 may tend to allow a width W1 of slide 104 to be reduced by dividing sliding surface into slide lanes 202 and 204 (FIG. 1), as slides having a physical barrier between lanes tend to have narrower width requirements. Accordingly, lane divider 200 may lead to a reduction in the materials included in canopy kit 320 and/or to a reduction in the overall size and inflatable volume of slide 104 which may result in less cost, less weight, less manufacturing materials and time, faster inflation, and quicker, more intuitive installation of canopy 300 in adverse conditions.

Figure 6:
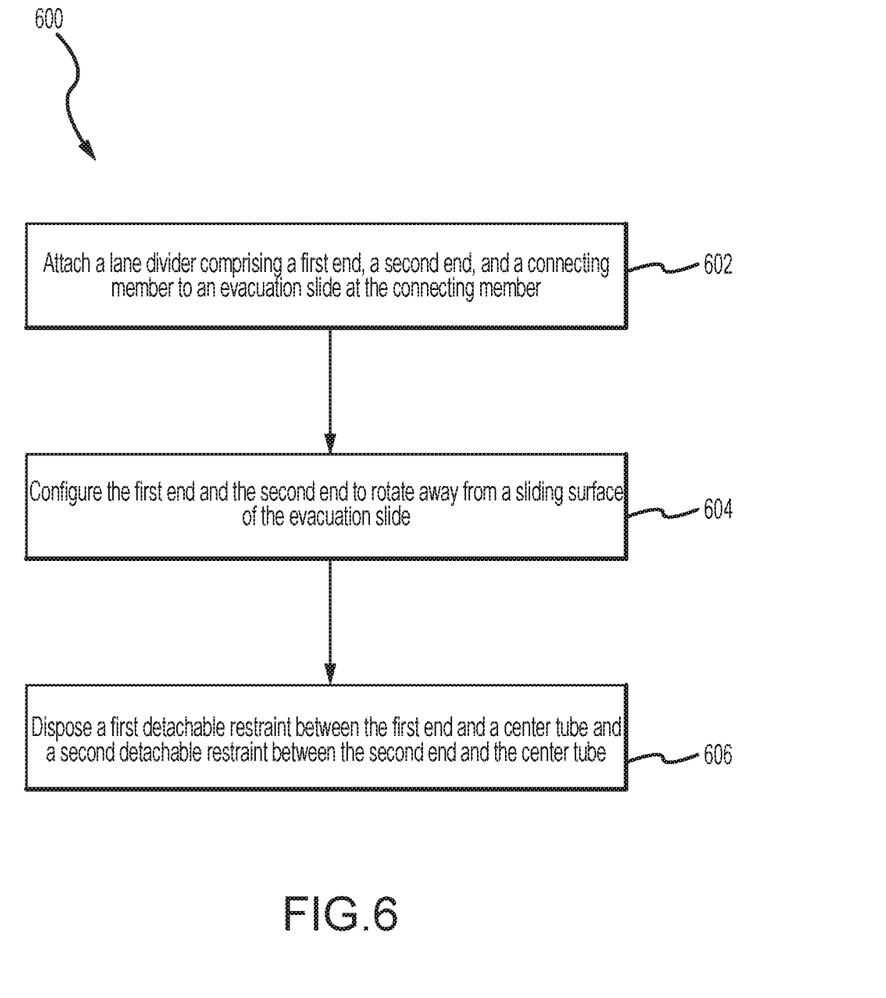
FIG. 6 illustrates a method of making an evacuation system, in accordance with various embodiments.

With reference to FIG. 6, a method 600 of making an evacuation system is illustrated, in accordance with various embodiments. Method 600 may comprise attaching a lane divider comprising a first end a second end and a connecting member to an evacuation slide at the connecting member (step 602), and configuring the first end and the second end of the lane divider to rotate away from a sliding surface of the evacuation slide (step 604). Method 600 may further comprise disposing a first detachable restraint between the first end and a center tube and a second detachable restraint between the second end and the center tube (step 606).

In various embodiments, with combined reference to FIGS. 3 and 6, step 602 may comprise attaching lane divider 200 to evacuation slide 104 along connecting member 210 and defining a first joint 214 and a second joint 212. Step 604 may comprise configuring first end 206 and second end 208 of lane divider 200 to rotate away from sliding surface 110 of evacuation slide 104. In various embodiments, step 604 comprises defining the first joint 214 between the connecting member 210 and the first end 206 and a second joint 212 between the connecting member 210 and the second end 208. Step 606 may comprise disposing first detachable restraint 226 between first end 206 of lane divider 200 and center tube 115 and disposing second detachable restraint 224 between second end 208 of lane divider 200 and center tube 115. In various embodiments, lane divider 200 may be in fluid communication with center tube 115 of evacuation slide 104. In various embodiments, disposing first detachable restraint 226 between first end 206 and center tube 115 may comprise coupling first portion 226a of detachable restraint 226 to center tube 115 and coupling second portion 226b of first detachable restraint 226 to first end 206. In various embodiments, disposing second detachable restraint 224 between second end 208 and center tube 115 may comprise coupling fourth portion 224a of second detachable restraint 224 to center tube 115 and coupling third portion 224b of second detachable restraint 224 to second end 208.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
   a packboard;
   an evacuation slide configured to deploy from the packboard; and
   a lane divider attached to the evacuation slide, wherein a first end and a second end of the lane divider are detachably coupled to a center tube of the evacuation slide,
   wherein a connecting member is coupled to the center tube between the first end and the second end of the lane divider.

2. The evacuation system of claim 1, wherein the lane divider is in fluid communication with the center tube.

3. The evacuation system of claim 1, wherein a detachable restraint is disposed between the first end and the center tube, the detachable restraint comprising:
   a first portion coupled to the center tube; and
   a second portion coupled to the first end, wherein the first portion of the detachable restraint detachably couples to the second portion of the detachable restraint.

4. The evacuation system of claim 3, wherein the detachable restraint comprises at least one of a hook-and-loop type fastener, a snap-fastener, or speed lacing.

5. The evacuation system of claim 1, further comprising a lanyard coupled to the first end and the second end of the lane divider, wherein the lanyard maintains the first end and the second end at a desired angle relative to a sliding surface.

6. The evacuation system of claim 1, further comprising a canopy disposed over the evacuation slide, wherein the first end and the second end support the canopy and maintain a distance between the canopy and the sliding surface.

7. The evacuation system of claim 6, further comprising:
   a first canopy support connecter attached to the canopy and a second canopy support connecter attached to the canopy;
   a first portion of a first detachable coupling attached proximate a first tip of the first end; and a second portion of a second detachable coupling attached proximate a second tip of the second end, wherein the first portion is coupled to the first canopy support connector and the second portion is coupled to the second canopy support connector.

8. The evacuation system of claim 1, wherein the first end and the second end of the lane divider comprise a conical shape.

9. The evacuation system of claim 1, wherein the first end and the second end are configured to rotate away from the sliding surface.

10. A slide for an evacuation system, comprising:
    a sliding surface, a center tube; and
    a lane divider attached to the center tube, wherein a first end and a second end of the lane divider are detachably coupled to the center tube of the evacuation slide, wherein a connecting member is coupled to the center tube between the first end and the second end of the lane divider, wherein in the sliding surface extends between a first side rail and a second side rail and is divided by the lane divider.

11. The slide of claim 10, wherein the lane divider is in fluid communication with the center tube.

12. The slide of claim 11, wherein a first detachable restraint is disposed between the first end and the center tube and a second detachable restraint disposed between the second end and the center tube.

13. The slide of claim 12, wherein the first detachable restraint comprises a first portion and a second portion, wherein the second detachable restraint comprises a third portion and a fourth portion, wherein the first portion and the fourth portion are coupled to the center tube, wherein the second portion is coupled to the first end, and wherein the third portion is coupled to the second end.

14. The slide of claim 13, further comprising a lanyard coupled between the first end and the second end, wherein the lanyard maintains the first end and the second end at a desired angle to the sliding surface.

15. The slide of claim 10, wherein the first end and the second end of the lane divider rotate away from the sliding surface.

16. The slide of claim 15, wherein the first end and the second end of the lane divider comprise a conical shape.

17. The slide of claim 13, further comprising a canopy having a surface facing the sliding surface, wherein the canopy comprises a first canopy connecter coupled to the surface and a second canopy connector coupled to the surface, wherein the second portion is removably coupled to the first canopy connector and the third portion is removably coupled to the second canopy connector.

18. A method of making an evacuation system, comprising:
- attaching a lane divider comprising a first end, a second end, and a connecting member to an evacuation slide at the connecting member; and
- configuring the first end and the second end of the lane divider to rotate away from a sliding surface of the evacuation slide, wherein the configuring comprises defining a first joint between the connecting member and the first end and a second joint between the connecting member and the second end.

19. The method of claim 18, further including disposing a first detachable restraint between the first end and a center tube and a second detachable restraint between the second end and the center tube.

20. The method of claim 18, wherein the lane divider is in fluid communication with the evacuation slide, wherein the coupling the connecting member defines a first joint and a second joint.

* * * * *